March 20, 1928.
F. M. REID
1,662,833
TRUCK PLATFORM
Filed Feb. 5, 1927
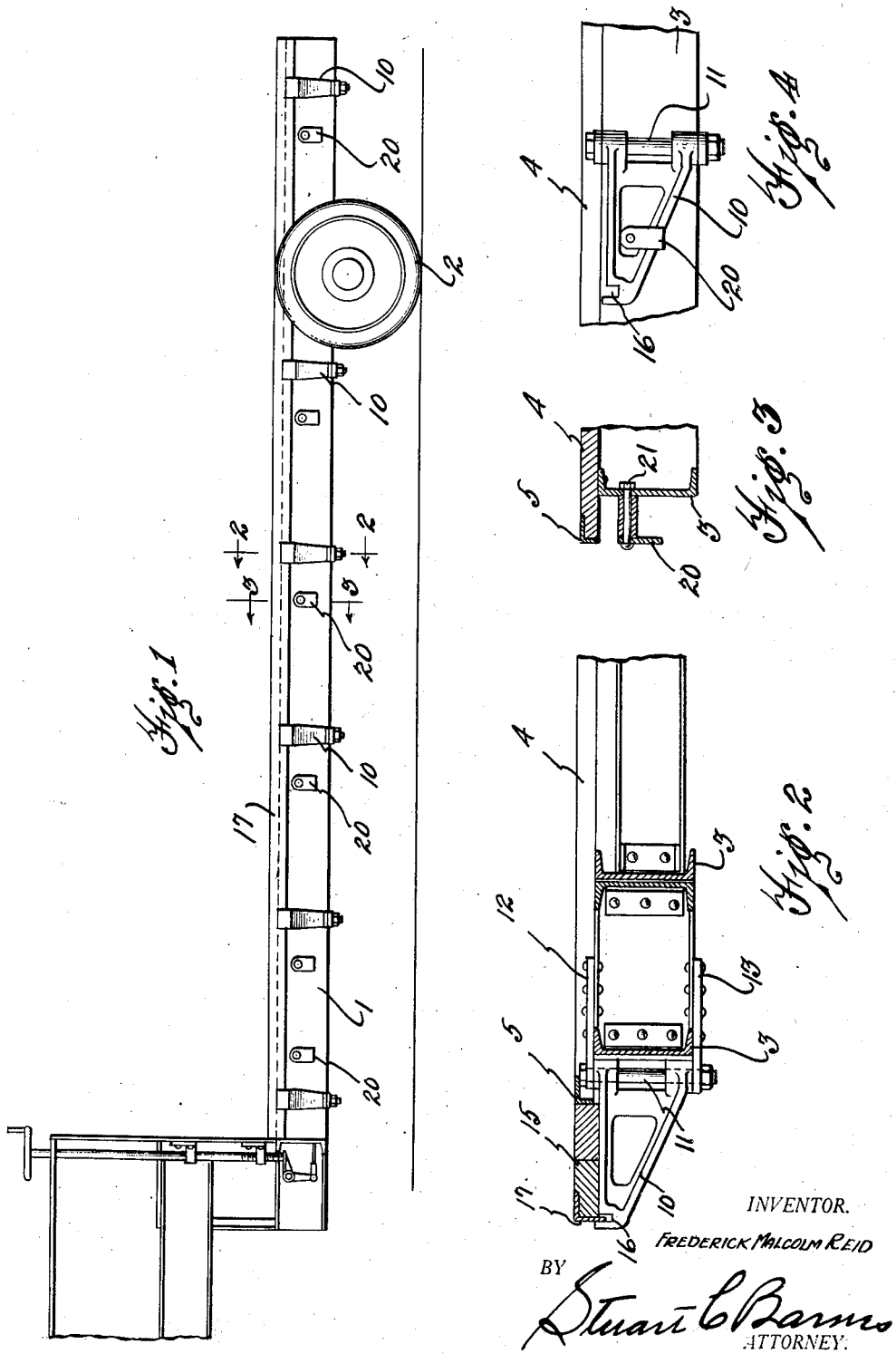
INVENTOR.
FREDERICK MALCOLM REID
BY
*Stuart C. Barnes*
ATTORNEY.

Patented Mar. 20, 1928.

1,662,833

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

TRUCK PLATFORM.

Application filed February 5, 1927. Serial No. 166,096.

This invention relates to trucks, and has to do particularly with a load supporting platform designed to meet varying requirements as regards dimensional limitations, and as regards the load to be carried.

In many kinds of work the nature of the load carried by a truck is such that a relatively wide platform is required. There are, however, many things which definitely limit the width to which platforms may be made. Among the things which limit the width of truck platforms are bridges, tunnels, ferries and the like, and where an operator of trucks is located so that his truck must move from time to time across a bridge, or across a stream upon a ferry, the limitations on platform width presents serious difficulties.

The present invention aims to provide a platform for a truck which is extensible at its sides. The platform may be used without such extensions when the nature of the work does not require a particularly wide platform, and these extensions are such that the parts can be folded up so as to lie within the edges of a fixed platform.

In the accompanying drawings:

Fig. 1 is a side elevation of a truck platform constructed in accordance with the invention.

Fig. 2 is a sectional view taken on line 2—2 of Fig. 1 showing the extension in use.

Fig. 3 is a sectional view taken on line 3—3 of Fig. 1.

Fig. 4 is a detail view of one of the bracket members in folded position.

The truck is shown in the drawings as being in the form of a trailer which is adapted to be drawn by a tractor, but this is done for the purpose of convenience and it is to be understood that the invention may be applied to trucks which move under their own power. The truck frame is indicated at 1, which is supported by rear wheels 2 and front wheels (not shown). The frame, as shown in Fig. 2 may be made up of angle members 3, and over the angle members is a load carrying platform 4. The edge of the platform is bounded by an angular metal piece 5. This platform constitutes the normal width of the truck. At spaced points along the side of the frame are brackets 10. These brackets may take the shape generally, as shown in Fig. 2, and each is mounted upon a vertical pin 11. Straps 12 and 13 are bolted or riveted to the frame and carry the pin 11. The upper strap 12 preferably underlies the platform 4, and for this purpose the platform may be cut away to provide a recess within which the strap 12 lies.

A platform extension 15 is adapted to be carried by the several brackets. In order to hold the platform extensions in place, an interlocking engagement with the brackets is desired. For this purpose each bracket is provided with a groove 16, and the extension is provided with an angular corner piece 17, with the vertical portion of the angle member projecting below the lower edge of the extension and lying within the groove 16, as shown in Fig. 2. Each of the brackets may be folded up, and it will be noted that the pivot pin 11 for each bracket is disposed inward of the edge 5 of the main platform. With this construction the brackets can be folded so as to completely lie within the edges of the main platform. In order to hold the brackets in folded position, pivoted locking plates 20 carried by studs 21 may be provided. The brackets are preferably formed of open construction and by turning the plate 20 the pin and plate may be caused to extend through the open construction of the bracket whereupon the plate may be swung downwardly to overlie a portion of the bracket, as shown in Fig. 4, to hold the same in folded position.

The invention affords a quick and easy change in platform width to vary the platform in accordance with the requirements of the load, or in accordance with the limitations dictated by bridge or ferry construction, or the like. To bring the extensions into use the brackets are swung outwardly and the removable extensions placed on the brackets. The reverse operation quickly reduces the width of the platform.

I claim:

1. In a truck, a truck platform comprising in combination, a main platform permanently in place, brackets pivoted to the side of the truck and arranged to be folded out of the way, a removable platform extension adapted to be carried by said brackets said brackets when folded out of the way lying substantially against the side of the truck, and means for holding them in this position.

2. In a truck, a truck platform comprising in combination, a main platform, brackets pivoted to the side of the truck, a removable platform extension adapted to be carried by said brackets, and interengaging devices on the brackets and the platform extension.

3. In a truck, a truck platform comprising in combination, a main platform, brackets pivoted to the side of the truck, and a removable platform extension adapted to be carried by said brackets, an angle iron at the outer edge of said platform extension, the vertical portion of said angle iron extending downwardly below the lower edge of the platform extension, and means on the brackets for engagement with said downwardly extending portion of the angle iron.

4. In a truck, a truck platform comprising in combination, a main platform, brackets pivoted to the side of the truck, and a removable platform extension adapted to be carried by said brackets, an angle iron at the outer edge of said platform extension, the vertical portion of said angle iron extending downwardly below the lower edge of the platform extension, and grooves in the brackets for receiving such depending portion of the angle iron.

5. In a truck having a frame, a truck platform comprising in combination, a main platform projecting over the edge of the frame, brackets pivoted to the frame underneath the projecting edges of the main platform for supporting a platform extension, said brackets being foldable so as to underlie the projecting edge of the main platform.

6. In a truck having a frame, a truck platform comprising in combination, a main platform projecting over the edge of the frame, brackets pivoted to the frame underneath the projecting edges of the main platform for supporting a platform extension, said brackets being foldable so as to underlie the projecting edge of the main platform, and means for holding the brackets in folded position.

7. In a truck having a frame, a truck platform comprising in combination, a main platform projecting over the edge of the frame, vertical pivot members secured to the frame underneath the projecting edge portion of the main platform, and a bracket mounted on each pivot member which can be folded so as to underlie the projecting edge of the main frame or positioned to extend outwardly, means for holding each bracket in folded position, and a platform extension adapted to be supported by the brackets when extended.

8. In a truck having a frame, a truck platform comprising in combination, a main platform projecting over the edge of the frame, vertical pivot members secured to the frame and a bracket mounted on each pivot member which can be folded so as to underlie the projecting edge of the main frame, or positioned to extend outwardly, means for holding each bracket in folded position, and a platform extension adapted to be supported by the brackets when extended, and interengaging devices on the brackets and platform extension.

In testimony whereof I affix my signature.

FREDERICK MALCOLM REID.